United States Patent

[11] 3,548,785

| [72] | Inventor | Cecil D. Cooper<br>20161 Glendale Ave., Lemoore, Calif. 93245 |
|---|---|---|
| [21] | Appl. No. | 830,946 |
| [22] | Filed | June 6, 1969 |
| [45] | Patented | Dec. 22, 1970 |

[54] ARTIFICIAL RUMEN STIMULATOR
10 Claims, 4 Drawing Figs.

[52] U.S. Cl. .................................................. 119/1, 119/51
[51] Int. Cl. ...................................................... A01k 67/00
[50] Field of Search ........................................... 119/1, 51

[56] References Cited
UNITED STATES PATENTS
| 3,152,573 | 10/1964 | Kusaka ........................ | 119/1 |
| 3,415,225 | 10/1968 | Collier ........................ | 119/1 |

*Primary Examiner*—Aldrich F. Medbery
*Attorney*—Huebner & Worrel

ABSTRACT: An artificial rumen stimulator for more thorough, rapid processing of a relatively greater volume of food by a ruminant providing an orally administratable body of substantially rigid lightweight material having a plurality of elongated resiliently flexible tentacles mounted thereon in an initially contracted position tightly wrapped about the body for subsequent expansion within the rumen to extended positions for engaging the portions of the walls of the rumen which are normally stimulated by natural coarse roughages.

PATENTED DEC 22 1970  3,548,785

CECIL D. COOPER
INVENTOR

Kustner & Korrel
ATTORNEYS 3,548,785

ARTIFICIAL RUMEN STIMULATOR

BACKGROUND OF THE INVENTION

The digestive processes of ruminant animals are unique in many ways. These animals are equipped to digest large amounts of low-quality feeds, mostly cellulose, by ingesting such food with little chewing, and swallowing it into four stomachs, the largest of which is the rumen. The rumen is not a true stomach since it is lined with epithelial cells and contains no digestive glands. Instead, it serves as a storage compartment, mixing organ, and a reservoir containing a high concentration of bacteria which serves to break up the more complex cellulose feeds into more simple radicals which are more readily digested. This feed is then regurgitated by the animal and masticated into finer particles that can be more easily attacked by the digestive enzymes of the true stomach and intestine. The rumen rhythmically contracts at a rate of approximately two contractions per minute. Such contractions serve to regurgitate the coarse food during rumination and to cause belching of the gases formed by the breaking down of the food by the bacteria within the rumen. The contractions of the rumen further induce continual mixing and movement of the food therein to prevent excessive fermentation and subsequent autointoxication. This entire process of mixing, regurgitating, remasticating and belching of gases is triggered by mechanical engagement of the rough feed such as hay and the like against the inside wall of the rumen.

Modernly, under domesticated conditions, the feed given to ruminants has been changed greatly. In order that such animals will make greater weight gains and produce larger quantities of milk, they have been provided with a diet which is much more concentrated and, in many instances, much less coarse than the roughage previously fed. As a result, the ruminants have become subject to varying degrees of atony of the rumen and accompanying sequela which condition produces various disorders including bloat, autointoxication, stasis of the remainder of the bowel and the like. These disorders contribute to a generally lower conversion ratio of feed fed to the ruminant to the amount and quality of the meat obtained therefrom or milk produced by the animal. Such conditions can, of course, be substantially remedied by the feeding of the usual coarse roughage feeds which, however, by their bulk, necessarily reduce the amount of concentrated feed that can be administered to the animal.

Attempts have been made artificially to stimulate the activity of the rumen in order to reduce the bulk of roughage fed to the animal in order to enable larger amounts of concentrated feeds to be administered. Such attempts have included feeding a large number of relatively small plastic objects to the ruminant having sharp edges which are intended to engage and stimulate the inner walls of the rumen. However, when such plastic objects are mixed with the feed, they sometimes are shredded along with the feed during mastication or if sufficiently hard to resist such shredding, the teeth of the animal are injured inasmuch as the masseter muscle that closes the jaw is the strongest muscle in the animal's body. Furthermore, the introduction of a sufficiently large quantity of such plastic objects to provide any substantial stimulation would be a long and laborious process. It has also been suggested that the objects could be placed within the rumen by operating on the animal which, however, is clearly not practical in view of the major abdominal surgery involved. Even if the plastic objects were successfully introduced into the rumen in the volume suggested by the advocators of such process, they would cover the entire top surface of the contents of the rumen and would tend to minimize the sloshing and turbulence thereof so necessary to the digestive process. Such dampening effect would also tend to preclude any limited stimulation by the usual contents of the rumen and the relatively small plastic objects, no matter how sharp, would not have enough force to do any appreciable amount of stimulating. Accordingly, the plastic objects would only be successful in inhibiting rumenation which would result in a dormant organ full of highly concentrated feed which would produce all the previously discussed disorders within the animal and a substantially poorer condition than would exist had the plastic objects not been utilized.

SUMMARY OF THE INVENTION

Accordingly, it is an object of the present invention to provide an improved artificial rumen stimulator for substantially increasing rumenation which minimizes the amount of roughage fed to the animal so as to permit the feeding of the more highly concentrated feeds without interfering with the natural digestive process.

Another object is to provide such an improved artificial rumen stimulator which permits the animal more thoroughly and rapidly to masticate a relatively greater volume of food with more efficiency so as to minimize the usual disorders occurring in such animals, including bloat, autointoxication, stasis of the bowel, and the like.

Another object is to provide an improved artificial rumen stimulator of the character described which is effective substantially to increase the conversion ratio of feed fed to the weight or meat obtained and/or milk produced by the animal.

Another object is to provide an improved artificial rumen stimulator consisting of a single device that can be easily and conveniently orally administered to the ruminant.

Another object is to provide an improved artificial rumen stimulator which has a specific gravity less than one so as to float upon the fluid contents of the rumen to ensure stimulating engagement with the wall portions thereof which are normally engaged and stimulated by the natural coarse roughage feed.

Another object is to provide such an improved artificial rumen stimulator which is constructed of a size precluding its regurgitation or of being passed posteriorly from the rumen.

Another object is to provide an improved artificial rumen stimulator which is formed of a nontoxic durable material capable of lasting the lifetime of the animal.

Other objects and advantages of the present invention will subsequently become more clearly apparent upon reference to the following description and accompanying drawing.

DESCRIPTION OF THE PREFERRED EMBODIMENT

Figure 1:
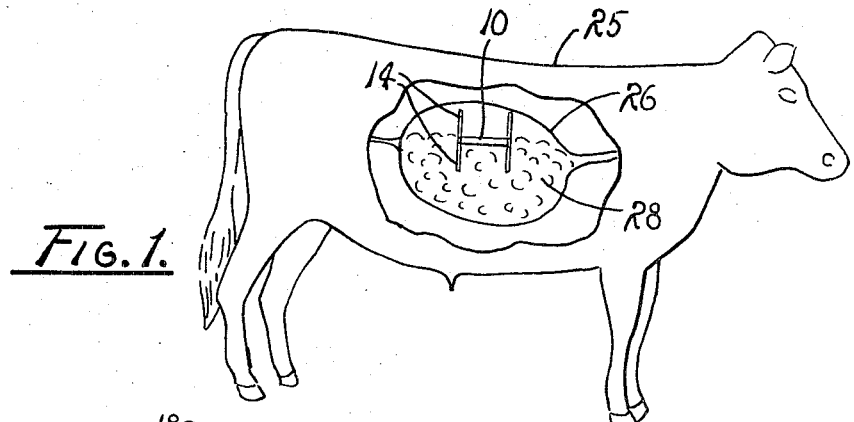
FIG. 1 is a side elevation of a bovine ruminant diagrammatically showing its rumen having an artificial rumen stimulator embodying the principles of the present invention disposed therein.

Referring more particularly to the drawing, an artificial rumen stimulator embodying the principles of the present invention provides an elongated substantially rigid rodlike body 10 constructed of a lightweight, nontoxic plastic material having opposite ends 11. A pair of sets of elongated tentacles 14 are individually disposed closely adjacent to each end of the body which are constructed of a similar but somewhat more pliable material as the body. The tentacles include inner ends 15 having a common hub 16 secured to their respective ends 11 of the body. The tentacles are substantially rectangular in cross section and have outer chisel point ends 18 so as to provide a plurality of stimulating points in substantially all radial directions from the body.

Figure 2:
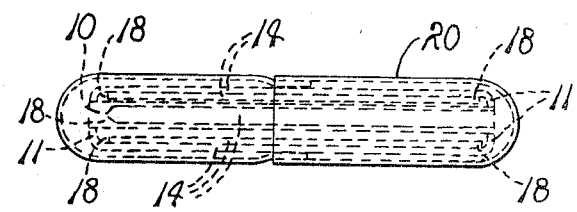
FIG. 2 is a somewhat enlarged side elevation of the artificial rumen stimulator of the present invention shown in a contracted encapsulated condition prior to introduction into the rumen.

The artificial rumen stimulator of the present invention is conditioned prior to use by folding the resiliently flexible tentacles downwardly along the body 10 in closely wrapped relation thereabout by extension of their outer ends 18 toward the end of the body opposite to their inner ends 15. As best shown in FIG. 2, a telescopically sectioned capsule 20 of a suitable gelatinous material, adapted to dissolve upon introduction into the rumen of the bovine, is disposed in constraining relation about the body and tentacles 14. Accordingly, the capsule is effective to hold the tentacles in their wrapped, contracted condition about the body until introduced into the rumen of the bovine.

As best shown in FIG. 1, a bovine ruminant 25 has a rumen 26 containing a quantity of fluid and food particles 28 disposed at a predetermined level therein. The rumen has a plurality of vagus nerve receptors, not shown, located on the inside wall thereof which, upon stimulation, initiate the rumenation process. These nerve receptors are normally stimulated by the coarse roughage fed to the bovine which floats upon the surface of the rumen contents for engagement with the upper walls of the rumen. Similarly, the artificial stimulator of the present invention has a specific gravity of less than one so as to ensure its also floating upon the surface of the rumen contents to ensure engagement of the outer pointed ends 18 of the tentacles 14 in substantially the same manner as the natural coarse roughage.

Figure 3:
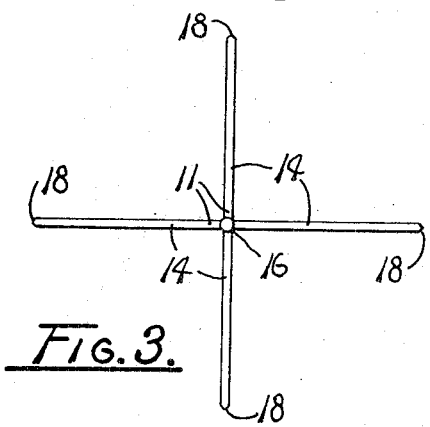
FIG. 3 is an end elevation of the artificial rumen stimulator disposed in its expanded operating position as when disposed within the rumen.
Figure 4:
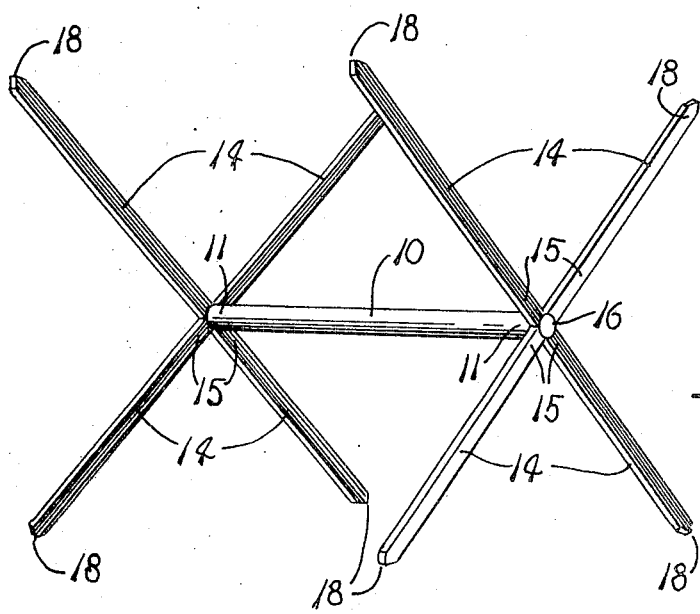
FIG. 4 is a somewhat enlarged perspective of the artificial rumen stimulator in its expanded position of FIG. 3.

In use, the encapsulated rumen stimulator of FIG. 2 is easily and conveniently orally administered to the ruminant. Upon deposit of the stimulator within the rumen, the capsule 20 is dissolved to release the tentacles 14 to their expanded radially extended positions of FIGS. 1, 3 and 4. The outer chisel point ends 18 of the tentacles continually engage the vagus nerve receptors on the inside wall of the rumen to initiate rumenation. As described, such engagement substantially simulates the usual stimulation produced by the rough forage normally fed to such animals.

The rumen contractions produced thereby are, of course, only a part of an intricate series of active digestive processes which cannot be separated. The rumenal contractions initiate regurgitation of food to the mouth, remastication of the food, and the return of such remasticated food to the rumen. Such stimulation also induces the belching of gases produced within the rumen so as to preclude bloat, autointoxication, and the like. By providing a constant source of stimulation, the stimulator of the present invention substantially increases the amount of time that the animal spends ruminating so that the food consumed is processed more thoroughly and rapidly. This not only increases the efficiency of the digestive process, but also the animal is able to consume a greater volume of food. Accordingly, the low-quality, natural roughage is no longer required and can successfully be replaced with more concentrated foods, resulting in a substantial increase in the ruminant's entire metabolic rate. It has been found that animals subjected to such increased metabolism are capable of making greater weight gains in the feed lot and milk cows are capable of producing larger quantities of milk.

The stimulator of the present invention can be constructed in various sizes corresponding to the size of the animal and may be specifically adapted to control the over-eating disease in lambs known as enterotoxemia. This disease is caused by the toxins produced by the bacteria Clostridium perfringens which normally inhabits the rumen of sheep but which will only multiply and cause death under certain conditions. Normally such disease occurs when the lambs are being fattened in the feed lot and are being fed a highly concentrated pelletized feed that contains little or no roughage. Accordingly, the rumen becomes dormant from lack of proper stimulation and the large mass of highly concentrated feed undergoes fermentation by the ever-present bacteria. As soon as these bacteria have used all of the available oxygen within the rumen, they multiply and produce lethal toxins. However, it has been found that if these animals are equipped with an artificial rumen stimulator of the present invention, the regular rumenal contractions continually mix the contents of the rumen with the gases produced therein including the oxygen necessary for the growth of the Clostridial bacteria. Accordingly, without oxygen, such bacteria cannot multiply. Presently, such lambs must be vaccinated against the Clostridium perfringens, which practice the stimulator of the present invention can eliminate. Similar disease is also found in bovine ruminants by the organism Clostridium sordelli which again is effectively controlled by the artificial rumen stimulator of the present invention.

It has also been the practice to feed cotton hulls, as an additive to the usual feed ration of milk-producing bovines, to increase the butterfat content of the milk. Normally, the butterfat content of the milk decreases during the spring and summer months which necessitates varying the type and amount of feed to the ruminants. As described, feeders have attempted to overcome this problem by adding certain roughage to the feed which variances can be eliminated by the use of the rumen stimulator of the present invention in substitution for the usual natural roughages fed to the animals.

It has also been found that the ingestion of solid foods is necessary to develop the rumen of young bovine into a functioning organ. Accordingly, calves that being ingesting hay at an early age develop a functioning rumen at a correspondingly earlier age than those calves that drink only milk. Modern husbandry methods stress the importance of early eating of solids by the rumen but can only hasten the process by offering a palatable feed substitute for the milk. It has been found that the introduction of an artificial rumen stimulator of the present invention at an early age provides the stimulation necessary for early rumen development to permit the relatively early feeding of solid foods to the animals.

Certain unnatural low-cost feeds developed from waste by-products have been employed but such feeds usually lack the necessary roughage to insure efficient digestion. Such feeds include cull cantaloupes, sugar beet tops and cotton seed screenings with the digestive disorders produced thereby usually offsetting the low cost of the feed so that their use is not practical. However, the full benefit from these low-cost feeds can be utilized through the use of the artificial rumen stimulator of the present invention. After extensive tests, no difficulty has been experienced in administering the artificial stimulator of the present invention since it is deposited directly into the rumen with no pathological disadvantages being observed in subsequently butchered animals.

In view of the foregoing, it is readily apparent that the structure of the present invention provides an improved artificial rumen stimulator which produces substantially continuous rumenation so that the ruminant can remasticate more food while maintaining sufficient space in the rumen for the more highly concentrated feeds which are more readily digested and assimulated by the animal. As a result, the animal is less subject to the usual disorders commonly plaguing the modern ruminant.

Although the invention has been herein shown and described in what is conceived to be the most practical and preferred embodiment, it is recognized that departures may be made therefrom within the scope of the invention.

I claim:

1. An artificial rumen stimulator for more thorough rapid processing of a relatively greater volume of food by a ruminant comprising an orally administerable body of substantially rigid lightweight material, and a plurality of elongated resiliently flexible tentacles mounted on the body in an initially contracted position folded against the body for ingestion of the stimulant and for subsequent expansion within the rumen to an extended position to engage the walls of the rumen.

2. The stimulator of claim 1 including means to hold said tentacles in their contracted positions and being effective to release them for expansion to their extended positions upon deposit in the rumen.

3. The stimulator of claim 2 in which said means is a capsule enclosing the tentacles and body of a material capable of being dissolved upon said deposit in the rumen.

4. The stimulator of claim 3 in which said body and tentacles have a specific gravity of less than one in order to float upon the fluid contents of the rumen with said tentacles engaging the upper walls of the rumen.

5. The stimulator of claim 4 in which said extended tentacles are of a length to ensure against regurgitation or posterior discharge of the stimulator from the rumen.

6. An artificial rumen stimulator for ruminant animals such as cattle, sheep and the like comprising an elongated cylindrical body of substantially rigid lightweight material adapted to be orally administered to the ruminant for deposit in the rumen, a plurality of elongated resiliently flexible tentacles mounted in spaced relation on the body, and a capsule of a material capable of being dissolved upon deposit within the rumen initially surrounding the tentacles when folded in contact with said body to hold said tentacles in a contracted position about the body but releasing them automatically to extended positions within the rumen to engage the walls of the rumen to provide substantially continuous stimulation for producing rumenal contractions and continuous activity of the digestive processes of the ruminant.

7. The stimulator of claim 6 in which said body and tentacles have a specific gravity of less than one in order to float upon the fluid contents of the rumen with said tentacles engaging the upper walls of the rumen.

8. The stimulator of claim 6 in which said extended tentacles are of a length to ensure against regurgitation or posterior discharge of the stimulator from the rumen.

9. The stimulator of claim 8 in which said body provides opposite ends, and a plurality of said tentacles being mounted in radially extended relation from each end of the body in their extended positions and springably folded in their contracted positions along the body toward the end of the body opposite to the end on which they are mounted.

10. The stimulator of claim 9 in which each of the tentacles has an outer chisel point end.